US011090670B2

(12) United States Patent
Fan et al.

(10) Patent No.: US 11,090,670 B2
(45) Date of Patent: Aug. 17, 2021

(54) HOLDER DEVICE WITH WATERWAY SWITCHING FUNCTION

(71) Applicant: XIAMEN SOLEX HIGH-TECH INDUSTRIES CO., LTD., Xiamen (CN)

(72) Inventors: Qihua Fan, Xiamen (CN); Fengde Lin, Xiamen (CN); Tianming Wang, Xiamen (CN); Wenxing Chen, Xiamen (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 12 days.

(21) Appl. No.: 16/429,933

(22) Filed: Jun. 3, 2019

(65) Prior Publication Data

US 2019/0366372 A1 Dec. 5, 2019

(30) Foreign Application Priority Data

Jun. 4, 2018 (CN) ......................... 201810566070.1

(51) Int. Cl.

| | |
|---|---|
| ***B05B 1/14*** | (2006.01) |
| ***F16K 11/04*** | (2006.01) |
| ***B05B 12/00*** | (2018.01) |
| ***B05B 1/16*** | (2006.01) |
| ***B05B 1/18*** | (2006.01) |

(52) U.S. Cl.

CPC ........ *B05B 12/0024* (2018.08); *B05B 1/1681* (2013.01); *B05B 1/185* (2013.01)

(58) Field of Classification Search

CPC ..... B05B 12/0024; B05B 1/1681; B05B 1/14; B05B 1/16; B05B 1/1662; B05B 1/18; B05B 1/1636; B05B 1/185; B05B 15/65; B05B 11/044; F16K 11/044

USPC .......................................................... 137/603

See application file for complete search history.

(56) References Cited

U.S. PATENT DOCUMENTS

| | | | | |
|---|---|---|---|---|
| 2,755,130 | A * | 7/1956 | Arant .................... | F16K 11/044 239/137 |
| 7,299,510 | B2 * | 11/2007 | Tsai ........................ | E03C 1/023 239/283 |
| 2007/0193640 | A1 * | 8/2007 | Malek ................... | B05B 1/3013 137/801 |
| 2012/0325353 | A1 * | 12/2012 | Zhou ..................... | B05B 1/1618 137/625 |
| 2014/0291419 | A1 * | 10/2014 | Pitsch ..................... | B05B 1/169 239/437 |

FOREIGN PATENT DOCUMENTS

| | | |
|---|---|---|
| CN | 201088942 | 7/2008 |

* cited by examiner

*Primary Examiner* — Paul J Gray

(74) *Attorney, Agent, or Firm* — Cooper Legal Group, LLC

(57) ABSTRACT

Disclosed is a holder device with waterway switching function. Water flows out of the first outlet waterway when the handle matter is pulled out of the socket, after the handle matter is inserted to the socket, water can flow out of the first outlet waterway, the second outlet waterway or the two outlet waterways by the second switch mechanism, the automatic switch and the practical need are elegantly combined, the present invention has compact structure and occupies small space.

18 Claims, 9 Drawing Sheets

HOLDER DEVICE WITH WATERWAY SWITCHING FUNCTION

TECHNICAL FIELD

The present invention relates to a plug of sanitary ware, particularly to a holder device with waterway switching function.

RELATED ART

Traditional sanitary wares like home use shower head comprises a switch valve, a fixing shower head, a hand held shower and a plug; the switch valve is disposed with an inlet waterway and two diversion waterways, the two diversion waterways are respectively connected to the fixing shower head and the hand held shower, the switch valve controls the fixing shower head or the hand held shower to outlet water; the holder is disposed with a plug portion for the hand held shower to plug. This kind of shower head has disadvantages: 1. The switch valve and the holder are independently disposed, they occupies large space and they are assembled inconveniently. 2. The waterways are switched manually, the shower head is not convenient to use.

To solve the shortcomings, someone proposes a solution titled a plug type shower head switch device in the Chinese patent database with publishing number CN201088942Y; the switch device is disposed with an inlet and two outlets at a plug, two outlets are respectively connected to the flexible pipe of the shower head and the outlet pipe of the top spraying shower head, a moving switch bolt is disposed between the two outlets, the front end of the switch bolt is elastically protruding to the sleeve of the front portion of the holder. This solution integrates the holder and the switch valve, the switch valve is controlled by the movement of the hand held shower that when the hand held shower is pulled out, water flows out of the hand held shower, when the hand held shower is plugged to the holder, water flows out of the fixing shower head. However, a new technical problems comes out: when the hand held shower is plugged to the holder, water flows out of the fixing shower head but not the hand held shower, but in the practical use, the function is limited if the user wants to use the hand held shower.

SUMMARY OF THE INVENTION

The present invention is provided with a holder device with waterway switching function, which overcomes the disadvantages of the existing known technology.

A first technical proposal of the present invention is that:

A holder device with waterway switching function, comprising a plug, the holder is disposed with a socket, an inlet waterway, a first outlet waterway, a second outlet waterway and a first valve member, the socket is disposed with a switch; wherein the holder is further disposed with a first diversion waterway, a second diversion waterway and a second valve member;

the first valve member is connected to the inlet waterway, the first diversion waterway and the second diversion waterway, the first valve member is connected to the switch in transmission way to achieve that when the switch is actuated, the first diversion waterway and the second diversion waterway are switched to connect to the inlet waterway, the first diversion waterway is connected to the first outlet waterway; the second valve member is connected to the second diversion waterway, the first outlet waterway and the second outlet waterway, the second valve member switches at least the first outlet waterway and the second outlet waterway to connect to the second diversion waterway.

The holder is further disposed with a unidirectional waterway, the unidirectional waterway is disposed with a check valve with the open state directed from the second diversion waterway to the first outlet waterway; the second valve member is connected to the second diversion waterway, the unidirectional waterway and the second outlet waterway, the second valve member switches the unidirectional waterway and the second outlet waterway to connect to the second diversion waterway, the unidirectional waterway is connected to the first outlet waterway.

The holder is further movably connected to an operation portion, the operation portion is connected to the second valve member in transmission way to drive the second valve member to move for switching.

The first valve member comprises a sliding switch bar slidable with respect to the holder, the sliding switch bar slides to switch between the first diversion waterway and the second diversion waterway to connect to the inlet waterway.

The first valve member further comprises a sealing ring fixedly connected to the sliding switch bar, the inlet of the first diversion waterway and the inlet of the second diversion waterway are spaced arranged, the outlet of the inlet waterway is disposed between the two inlets, the sealing ring is disposed between the two inlets and is coupled to the inlets, when the sealing ring closes one inlet, the other inlet is connected to the inlet waterway.

The switch comprises a moving element movably connected to the socket, the moving element is connected to the first valve member in transmission way, when the socket is plugged by a handle matter or the handle matter is pulled out of the socket, the moving element moves with respect to the socket to trigger the first valve member.

The first valve member comprises a sliding switch bar slidable with respect to the holder, the sliding switch bar slides to switch between the first diversion waterway and the second diversion waterway to connect to the inlet waterway; the switch comprises a moving element movably connected to the socket, the moving element is connected to the sliding switch bar in transmission way, when the socket is plugged by a handle matter or the handle matter is pulled out of the socket, the moving element moves with respect to the socket to control the sliding switch bar to slide.

The moving element is connected to the socket in swinging way, the moving element abuts against the first valve member to push the first valve member to slide.

The holder is further slidably connected with a push block, the push block abuts between the first valve member and the moving element.

The socket is disposed with a plugged space, the moving element moves between the pull-out position and a plug-in position with respect to the socket, the moving element in the pull-out position has at least a portion plugged in the plugged space.

An elastic element is disposed between the first valve member and the holder, the elastic element stores energy when the socket is plugged by a handle matter and releases energy when the handle matter is pulled out of the socket to drive the first valve member to reposition.

The second valve member comprises a rotating switch portion rotatable with respect to the holder, the rotating switch portion rotates to switch between the unidirectional waterway and the second outlet waterway to connect to the second diversion waterway.

The outlet of the second diversion waterway is disposed with an annular chamber, the inlet of the unidirectional waterway and the inlet of the second outlet waterway are spaced arranged along the periphery wall of the annular chamber; the second valve member further comprises a sealing pad fixedly disposed at the rotating switching portion, the sealing pad is coupled to the inlets that when the sealing pad closes one inlet, the other inlet is connected to the annular chamber.

The first valve member comprises a sliding switch bar slidable with respect to the holder, the sliding switch bar slides to switch between the first diversion waterway and the second diversion waterway to connect to the inlet waterway; the second valve member comprises a rotating switch portion, the rotating switch portion rotates to switch between the unidirectional waterway and the second outlet waterway to connect to the second diversion waterway; the rotating switch portion is arranged along the center line of the holder, the sliding switch bar is eccentrically arranged with respect to the center line.

A second technical proposal of the present invention is that:

A holder device with waterway switching function, comprising a plug, the holder is disposed with a socket, an inlet waterway, a first outlet waterway, a second outlet waterway and a first valve member; the socket is disposed with a switch; wherein the holder is further disposed with a first diversion waterway, a second diversion waterway and a second valve member;

the first valve member is connected to the inlet waterway, the first valve member at least switches the first diversion waterway and the second diversion waterway to connect to the inlet waterway, the first diversion waterway is connected to the first outlet waterway;

the second valve member is connected to the second diversion waterway, the first outlet waterway and the second outlet waterway, the second valve member is connected to the switch in transmission way to achieve that when the switch is actuated the first outlet waterway and the second outlet waterway are switched to connect to the second diversion waterway.

The holder is further disposed with a unidirectional waterway, the unidirectional waterway is disposed with a check valve with the open state directed from the second diversion waterway to the first outlet waterway; the second valve member is connected to the second diversion waterway, the unidirectional waterway and the second outlet waterway, the second valve member switches the unidirectional waterway and the second outlet waterway to connect to the second diversion waterway, the unidirectional waterway is connected to the first outlet waterway.

The holder is further movably connected to an operation portion, the operation portion is connected to the second valve member in transmission way to drive the second valve member to move for switching.

Compared to the existing known technology, the proposal of the present invention has advantages:

1. Water flows out of the first outlet waterway when the handle matter is pulled out of the socket, after the handle matter is inserted to the socket, water can flow out of the first outlet waterway, the second outlet waterway or the two outlet waterways by the second valve member, the automatic switch and the practical need are elegantly combined, the present invention has compact structure and occupies small space.
2. The unidirectional waterway is disposed with a check valve with open state from the second diversion waterway to the first diversion waterway, the second valve member is connected to the second diversion waterway, the unidirectional waterway and the second outlet waterway, the second valve member switches the unidirectional waterway and the second outlet waterway to connect to the second diversion waterway, the unidirectional waterway is connected to the first outlet waterway, preventing water flowing to the second outlet waterway, the waterway switching is stable and reliable.
3. The first valve member comprises a sliding switch bar slidable with respect to the holder, the sliding switch bar slides to switch between the first diversion waterway and the second diversion waterway to connect to the inlet waterway, the transmission is simple and the structure is simple.
4. The moving element is connected to the socket in swinging way, the moving element abuts against the first valve member to push the first valve member to slide, the structure is simple, the switch controlling has high accuracy.
5. The rotation switch portion is arranged along the center line of the holder, the sliding switch bar is eccentric with respect to the center line, the arrangement is reasonable, the structure is compact.

BRIEF DESCRIPTION OF THE DRAWINGS

The present invention will be further described with the drawings and the embodiments.

DETAILED DESCRIPTION OF THE EMBODIMENTS

Figure 1:
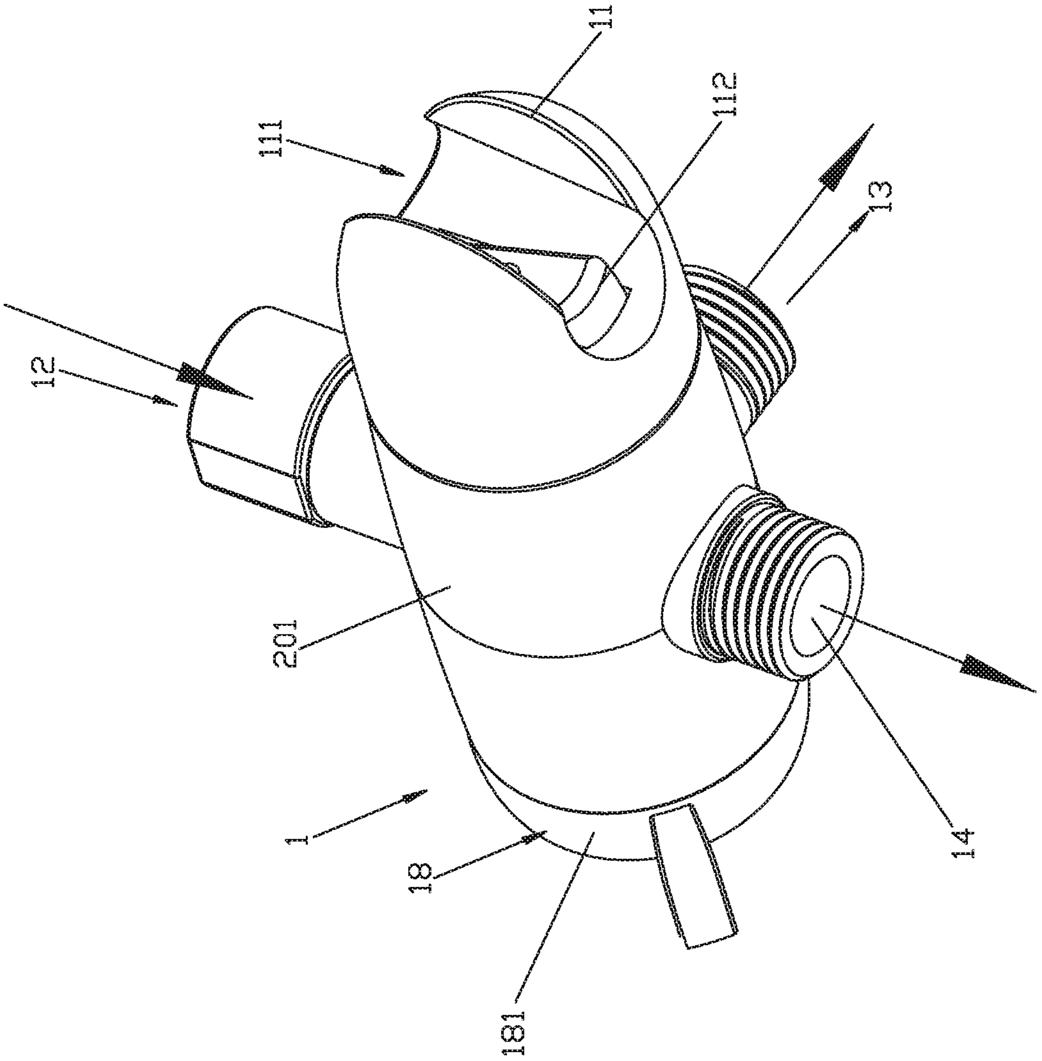
FIG. 1 illustrates a schematic diagram of the holder device of the present invention.
Figure 2:
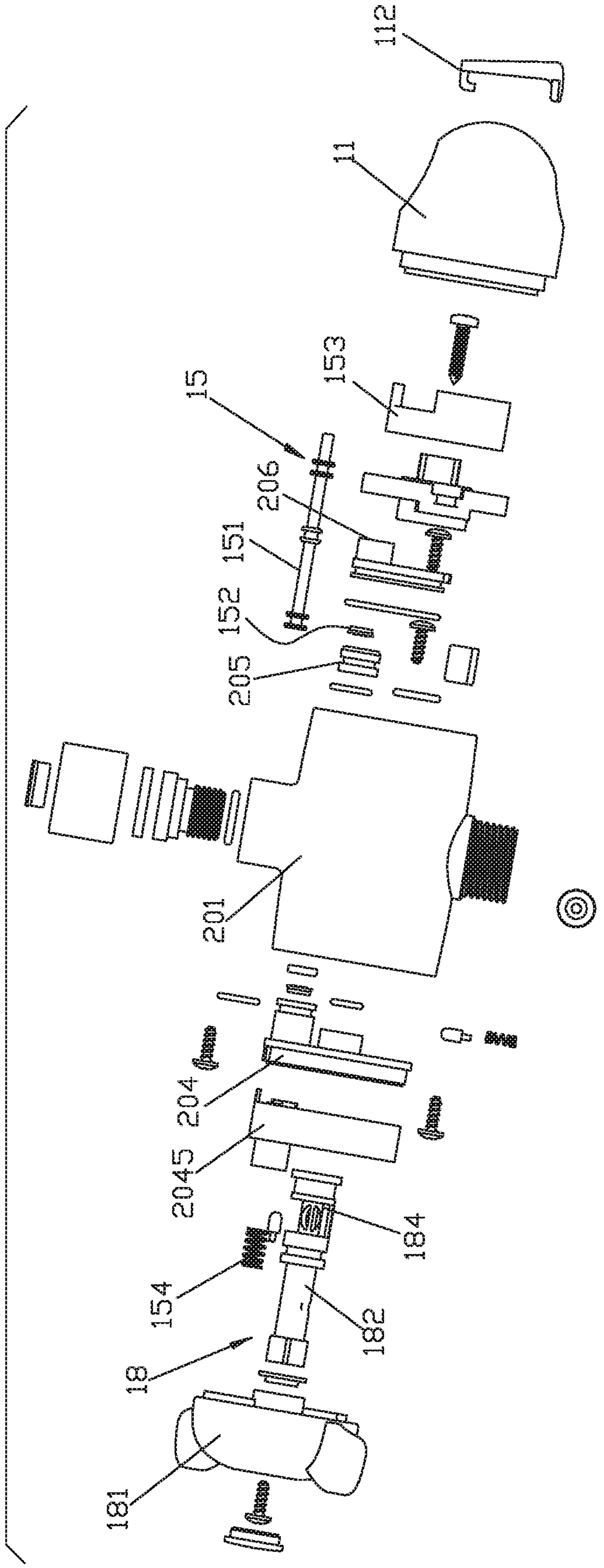
FIG. 2 illustrates an exploded diagram of the holder device of the present invention.
Figure 3:
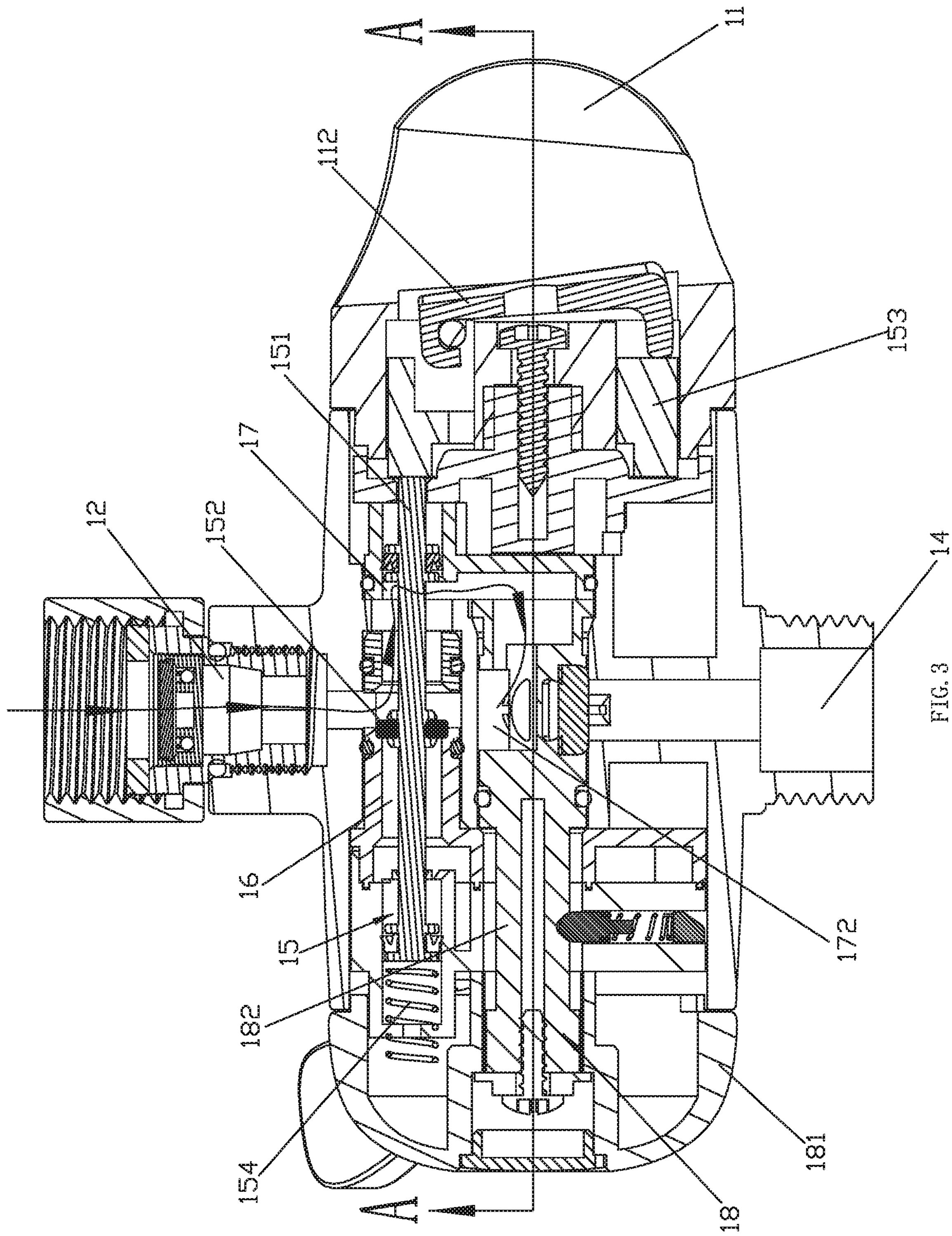
FIG. 3 illustrates a sectional diagram of the holder device of the present invention when the handle matter (not figured out) is inserted to the socket of the holder device.
Figure 4:
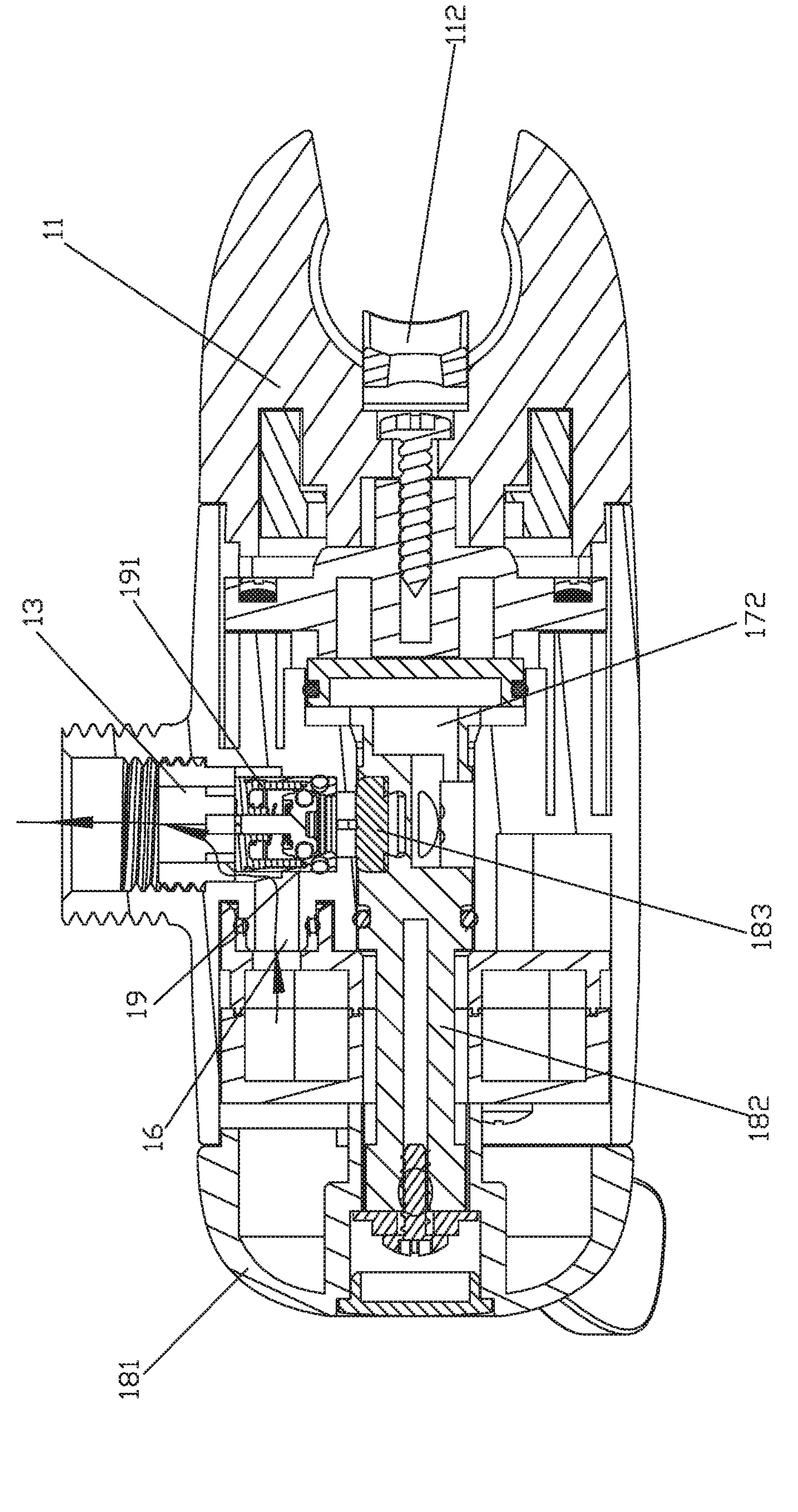
FIG. 4 illustrates a sectional diagram of A-A of FIG. 3.
Figure 5:
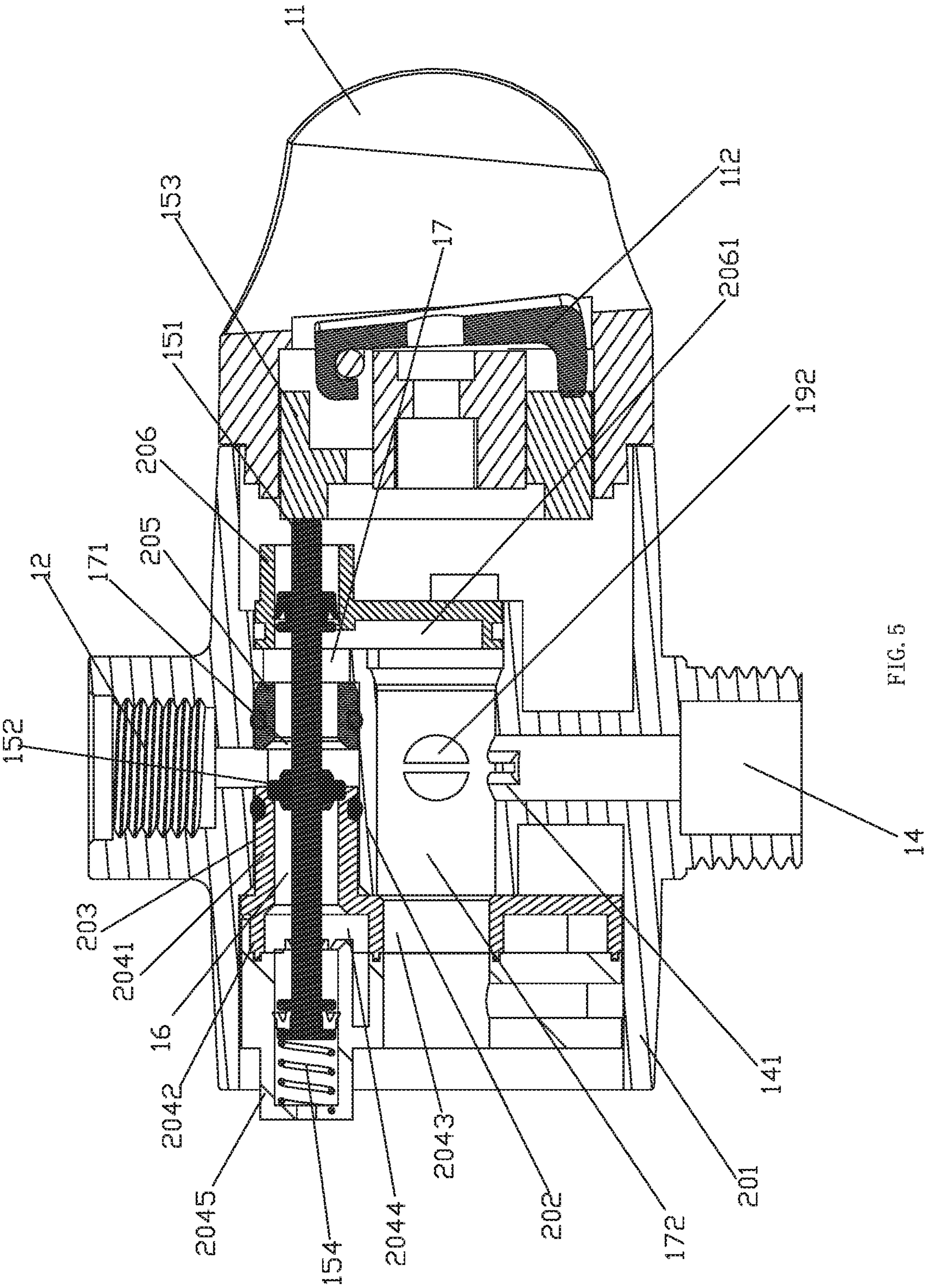
FIG. 5 illustrates a simplified sectional diagram of the holder device when the handle matter (not figured out) is inserted to the socket of the holder device.
Figure 6:
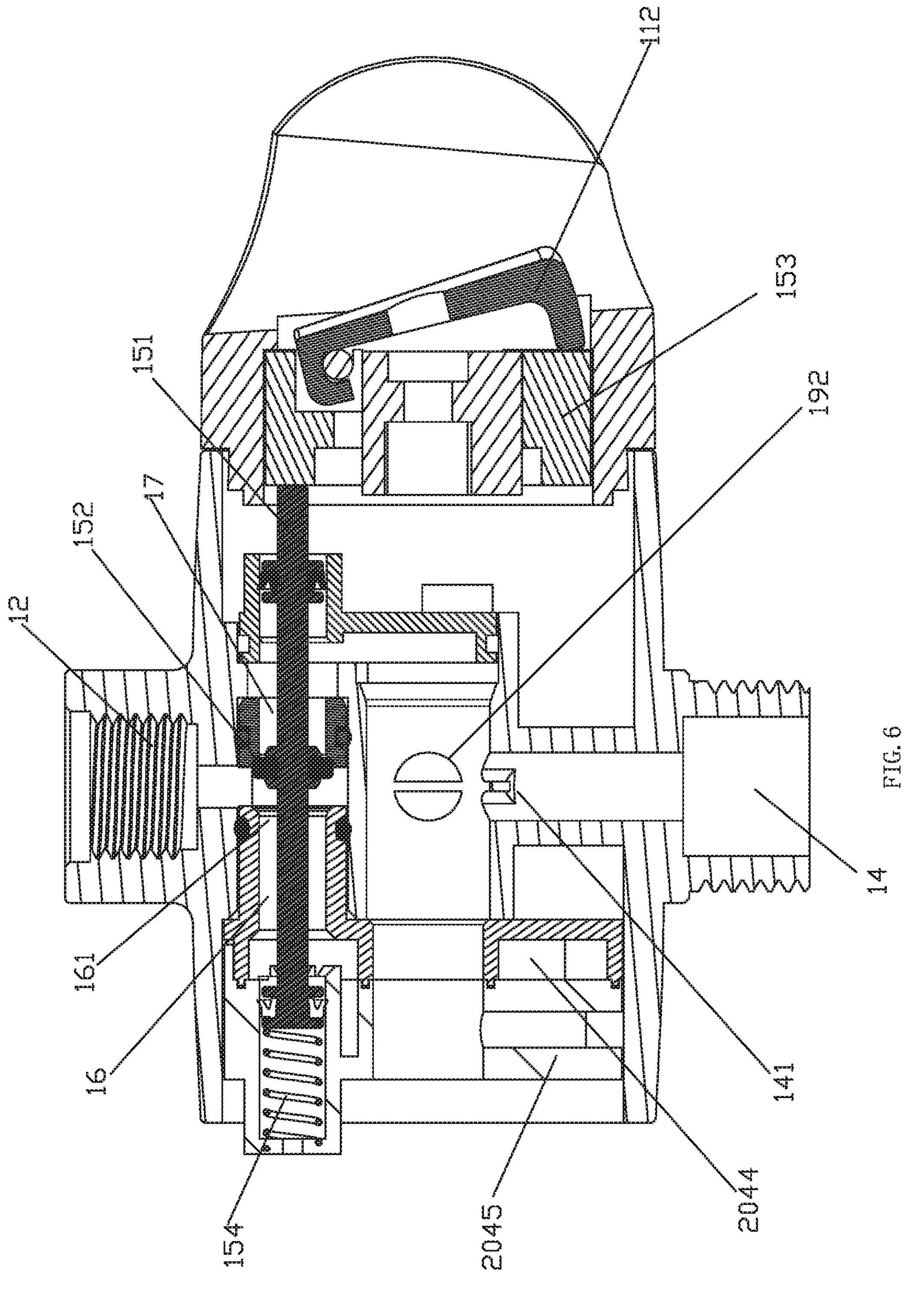
FIG. 6 illustrates a simplified sectional diagram of the holder device when the handle matter (not figured out) is pulled out of the socket.
Figure 7:
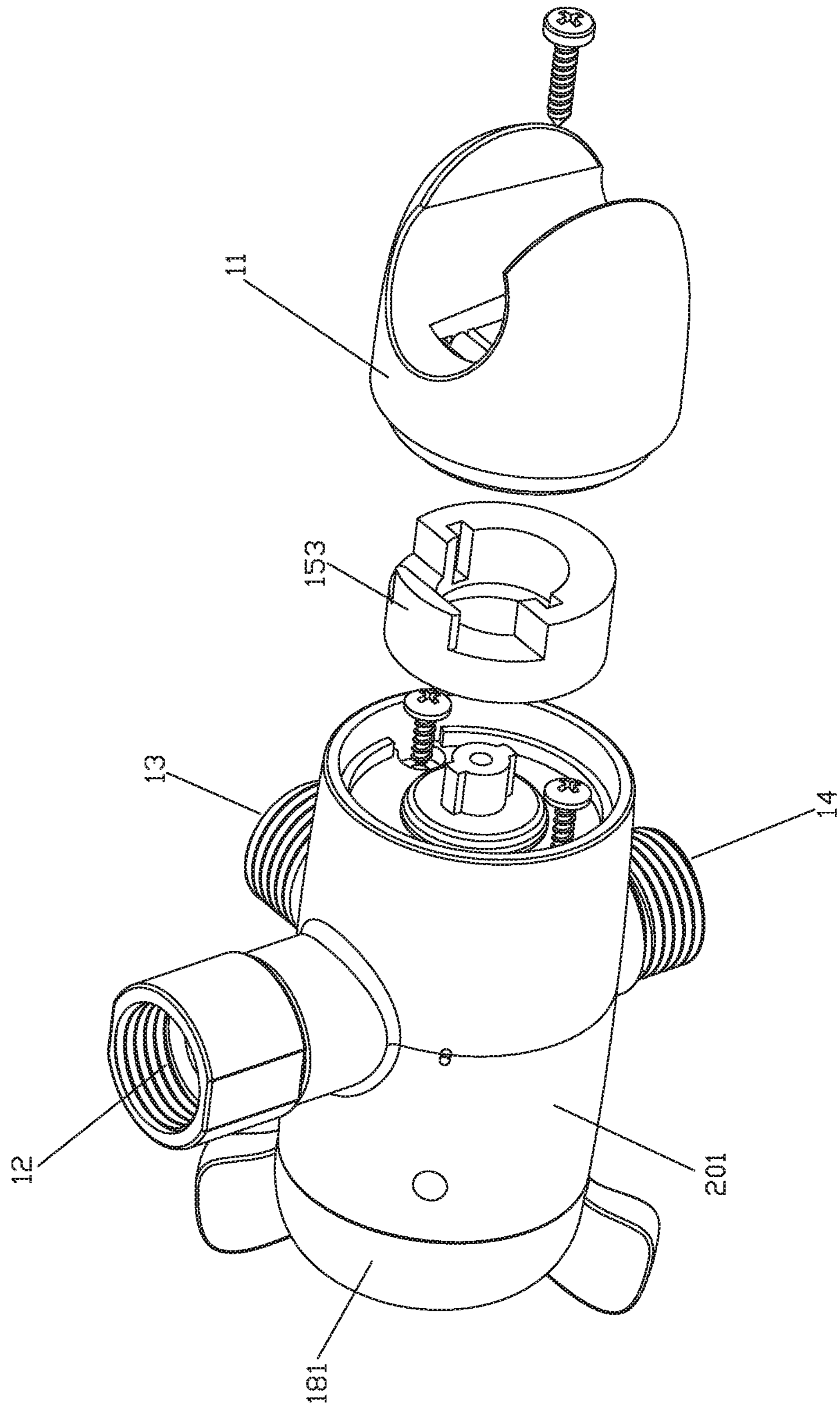
FIG. 7 illustrates a partial exploded diagram of the holder device of the present invention.
Figure 8:
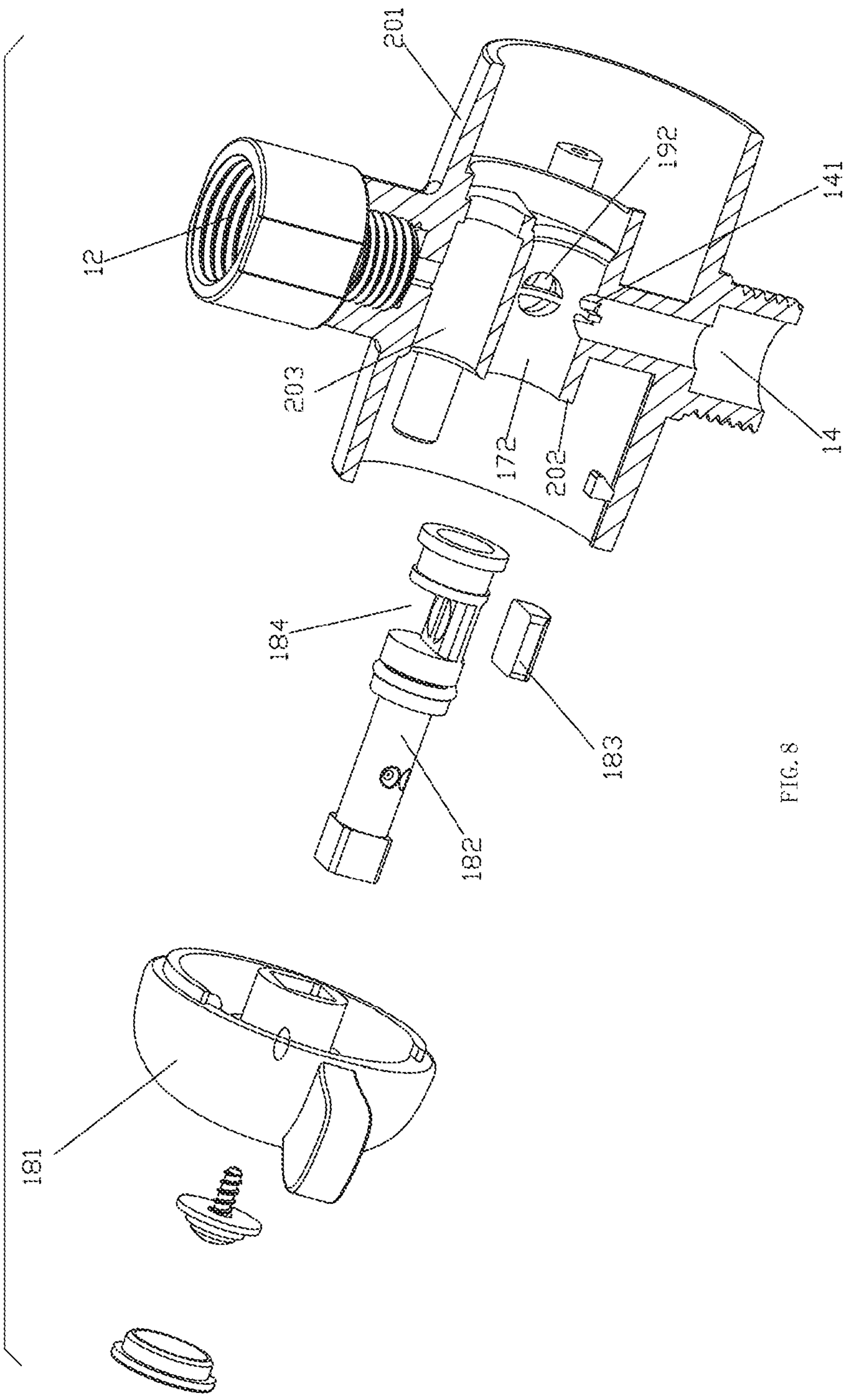
FIG. 8 illustrates a simplified exploded diagram of the holder device of the present invention.

A holder device with waterway switching function, referring to FIGS. 1-9, comprises a plug 1, the holder 1 is disposed with a socket 11, an inlet waterway 12, a first outlet waterway 13, a second outlet waterway 14, a first valve member 15, a first diversion waterway 16, a second diversion waterway 17, a second valve member 18 and a unidirectional waterway 19.

The socket 11 is structured liked C shaped or sleeve shaped that it can be referred to the existing known technology. The socket 11 is disposed with a plugged space 111 for a handle matter (a hand shower head 5 for example) to plug, the handle matter is plugged to the plugged space 111. The socket 11 is disposed with a switch, the switch comprises a moving element 112 movably connected to the socket 11, the moving element 112 moves between a pull-out position (as figured in FIG. 6) and a plug-in position (as figured in FIG. 6) with respect to the socket 11. The moving element 112 at the pull-out position has at least a portion protruded into the plugged space 111 for the plugged handle matter to drive the moving element 112 to move. In this embodiment, the moving element 112 is connected to the socket 11 in swinging way, a first end of the moving element 112 is rotatably connected to the socket 11, a second end of the moving element 112 at the pull-out position protruded into the plugged space 111.

The first valve member 15 is connected to the inlet waterway 12, the first diversion waterway 16 and the second diversion waterway 17; the first valve member 15 and the moving element 112 are connected in transmission way, so when the moving element 112 is actuated, the first diversion waterway 16 and the second diversion waterway 17 are switched to connect to the inlet waterway, and the first diversion waterway 16 is connected to the first outlet waterway 13; the moving element 112 being actuated is exampled that: 1. when the handle matter is inserted to the socket 11, it triggers the moving element 112 to make the second end of the moving element 112 move in the direction away from the plugged space 111; 2. when the handle matter is pulled out of the socket 11, the second end of the moving element moves towards the plugged space 111 to protrude into the plugged space 111.

In this embodiment, the first valve member 15 comprises a sliding switch bar 151 slidable with respect to the holder 1 and a sealing ring 152 fixedly connected to the sliding switch bar 151; the inlet 161 of the first diversion waterway 16 and the inlet 171 of the second diversion waterway 17 are spaced arranged, the outlet of the inlet waterway 12 is disposed between the two inlets 161, 171. the sealing ring 152 is disposed between the two inlets 161 and 171 and it can be coupled to the two inlets. The sliding switch bar 151 slides to drive the sealing ring 152 to slide to make the sealing ring 152 close one inlet, so the other inlet is connected to the inlet waterway 12 (as figured in FIG. 5 and FIG. 6), the sliding switch bar 151 drives the sealing ring 152 to slide and switch between the first diversion waterway 16 and the second diversion waterway 17 to connect to the inlet waterway 12. In a detailed structure, the sliding switch bar 151 comprises a sliding rod 155, the center portion of the sliding rod 155 is protruding annularly with an annular collar, the annular collar is concaved with an assembly groove, the sealing ring is fixedly assembled in the assembly groove.

The moving element 112 is connected to the sliding switch bar 151 in transmission way, so when the moving element 112 is actuated, it drives the sliding switch bar 151 to slide. Preferred, the holder 1 is slidably disposed with a push block 153, which abuts between the sliding switch bar 151 and the moving element 112, namely, the second end of the moving element 112 abuts against the push block 153, the push block 153 abuts against the first end of the sliding switch bar 151.

An elastic body 154 is disposed between the first valve member 15 and the holder 1.

The elastic body 154 stores energy when the handle matter is inserted to the socket 11 and releases energy when the handle matter is pulled out of the socket 11 to reset the first valve member 15. The elastic body 154 releases energy to push the sliding switch bar 151 to slide and reset after the handle matter is pulled out of the socket 11, so the moving element is actuated. As needed, the elastic body 154 can be disposed between the moving element and the holder to drive the moving element to reset, the moving element pulls the first valve member to slide and reset (the first valve member and the moving element are connected in a pulling way, by a push block for example). In a detailed structure, the first end of the sliding rod 155 abuts against the push block 153, the elastic body 154, a spring for example, abuts against the second end of the sliding rod 155.

The second valve member 18 is connected to the second diversion waterway 17, the unidirectional waterway 19 and the second outlet waterway 14, the second valve member 18 at least switches the unidirectional waterway 19 and the second outlet waterway 14 to connect to the second diversion waterway 17. The unidirectional waterway 19 is connected to the first outlet waterway 13, the unidirectional waterway 19 is disposed with a check valve 191 with open state from the second diversion waterway 17 to the first outlet waterway 13. the holder 1 is further movably connected with an operation portion 181, which is connected to the second valve member 18 in transmission way to drive the second valve member 18 to move for switching. In a detailed structure, the second valve member 18 comprises a rotating switch portion 182 rotatable with respect to the holder 1 and a sealing pad 183 fixedly connected to the rotating switch portion 182, the outlet of the second diversion waterway 17 is disposed with an annular chamber 172, the inlet 192 of the unidirectional waterway 19 and the inlet 141 of the second outlet waterway 14 are spaced arranged along the periphery wall of the annular chamber 172. The sealing pad 183 is coupled to the inlets 192, 141. When the sealing pad 183 closes one inlet, such as the inlet 192, the other inlet, such as inlet 141 is connected to the annular chamber 172, vice versa. Or when the sealing pad 183 is away from the two inlets 192 and inlets 141, the annular chamber 172 is connected to the inlets 141, 192 at the same time.

In this embodiment, the rotating switch portion 182 is arranged along the center line of the holder 1, the sliding switch bar 151 is eccentrically arranged with respect to the center line. The holder 1 is disposed with an external revolution wall, the center line of the holder 1 is the axis of the external revolution wall of the holder 1.

Figure 9:
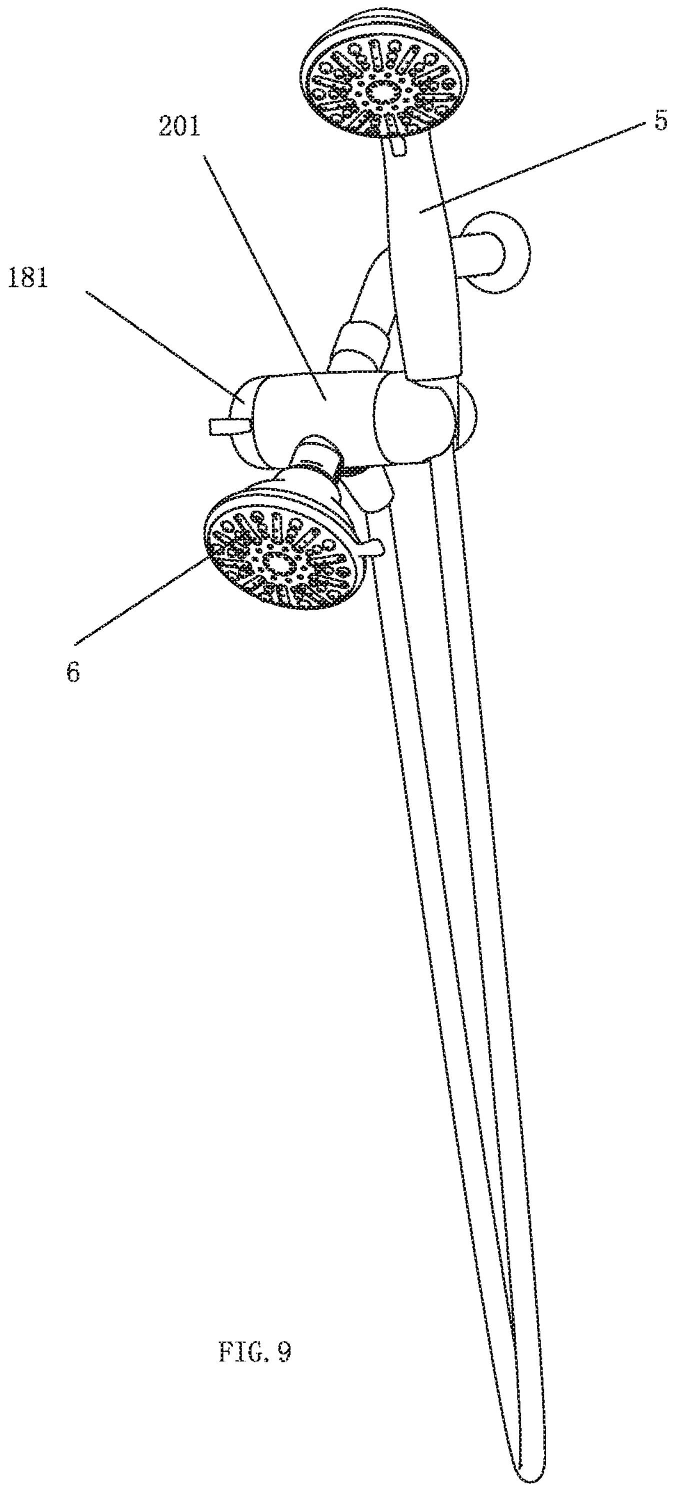
FIG. 9 illustrates a schematic diagram of a hand held shower being plugged to the plug of the holder device of the present invention.

As figured in FIG. 9, the handle matter, which is a hand held shower 5, is connected to the first outlet waterway 13 by a flexible pipe 4, a top spraying shower head 6 is connected to the second outlet waterway 14. In the process of use:

1. when the hand held shower 5 is pulled out of the socket 11 of the holder 1, the moving element 112 is freely moving, the sliding switch bar 151 slides without restriction, the elastic body 154 pushes the sliding switch bar 151 to slide and reset, the sealing ring 152 closes the inlet 171 of the second diversion waterway 17, the inlet waterway 12 is connected to the inlet 161 of the first diversion waterway 16, water flows from the inlet waterway 12 into the first diversion waterway 16 and then flows into the first outlet waterway 13, finally water flows out of the hand held shower 5;
2. when the hand held shower 5 is inserted to the socket 11, it drives the moving element 112 to move to push the push block 153 to move and the sliding switch bar 151 to slide, the sealing ring 152 closes the inlet 161 of the first diversion waterway 16, the inlet waterway 12 is connected to the inlet 171 of the second diversion waterway 17, water flows from the inlet waterway 12 to the second diversion waterway; at this time, the user can operate the operation portion 181 to control the second valve member 18 to choose: a. water flows from the second diversion waterway 17 into unidirectional waterway 19 and then flows into the first outlet waterway 13, finally water flows out of the hand held shower; b. water flows from the second diversion waterway 17 into the second outlet waterway 14, finally water flows out of the top spraying shower head 6. c. water flows from the second diversion waterway 17 into the unidirectional waterway 19 and the second outlet waterway 14 at the same time, so water flows out of the hand held shower 5 and top spraying shower head 6 at the same time.

In a detailed structure of this embodiment:

The holder 1 comprises an external annular wall 201, an internal annular wall 202 fixedly disposed in the external annular wall 201, a coupling annular wall 203 fixedly disposed at the annular gap between the external and internal annular wall, a first connecting portion 204, a second sleeve body 205 and a second connecting portion 206.

The inlet waterway 12 comprises the passage from the external annular wall 201 to the coupling annular wall 203; the first outlet waterway 13 is guided from the inside of the external annular wall to the outside, the internal annular wall 202 composes the annular chamber 172 of the second diversion waterway 17.

The first connecting portion 204 comprises a first sleeve body 2041 and a first connecting base 2042 fixedly connected to the end face of the first sleeve body 2041, the first connecting base 2042 is disposed with a first through hole 2043 corresponding to the internal annular wall 202, the external end face of the first connecting base 2042 is disposed with an annular groove 2044, the annular groove 2044 is connected to the first sleeve body 2041, the annular groove 2044 is further connected to the first outlet waterway 13; the first sleeve body 2041 is inserted to the coupling annular wall 203 in coupling way, the first diversion waterway 16 comprises the first sleeve body 2041 and the annular groove 2044; a sealing cap 2045 is further provided to fixedly close the annular groove 2044.

The second sleeve body 205 is inserted to the coupling annular groove 203. the first sleeve body 2041 and the second sleeve body 205 are opposite arranged, the inlet of the first sleeve body 2041 and the inlet of the second sleeve body 205 compose the inlet 161 and 171; the second connecting portion 206 is coupled to the internal annular wall 202 and the coupling annular wall 203 to form a water passage 2061, the water passage 2061 is connected to the second sleeve body 205 and the internal annular wall 202; the second diversion waterway 17 comprises the second sleeve body 205, the water passage 2061 and the internal annular wall 202. The sliding switch bar 151 is slidably connected between the first sleeve body and the second sleeve body. One end of the elastic body abuts against the sealing cap 2045, the other end abuts against the sliding switch bar; one end of the sliding switch bar 151 is slidably extended out of the second connecting portion 206 in sealing way for the push block to abut.

The rotating switch portion 182 is rotatably connected in the internal annular wall 202, the rotating switch portion 182 is disposed with an assembly portion 184 for the fixing assembling of the sealing pad 183. The operation portion 181 is rotatably connected to the first end of the holder, the socket is formed at the second end of the holder. The operation portion 181 is fixedly connected to the rotating switch portion 182 to drive the rotating switch portion 182 to rotate. The second outlet waterway comprises the passage from the internal annular wall to the external annular wall.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A holder device with waterway switching function, comprising:

a holder, wherein:

the holder is disposed with a socket, an inlet waterway, a first outlet waterway, a second outlet waterway, and a first valve member, the socket is disposed with a switch, the holder is disposed with a first diversion waterway, a second diversion waterway, and a second valve member, the first valve member is connected to the inlet waterway, the first diversion waterway, and the second diversion waterway, the first valve member is operatively connected to the switch to enable the first diversion waterway and the second diversion waterway to be switched to be alternatively in communication with the inlet waterway when the switch is triggered, the first diversion waterway is in communication with the first outlet waterway, the holder is disposed with a unidirectional waterway, the unidirectional waterway is disposed with a check valve configured to be open to enable water to flow in a direction from the second diversion waterway to the first outlet waterway, the second valve member is connected to the second diversion waterway, the unidirectional waterway, and the second outlet waterway, the second valve member is configured to enable the unidirectional waterway and the second outlet waterway to be switched to be alternatively in communication with the second diversion waterway, and the unidirectional waterway is in communication with the first outlet waterway.

2. The holder device with waterway switching function according to claim 1, wherein:

the holder is movably connected to an operation portion, and the operation portion is operatively connected to the second valve member to drive the second valve member to move for switching.

3. The holder device with waterway switching function according to claim 1, wherein:

the first valve member comprises a sliding switch bar configured to slide relative to the holder, and the sliding switch bar slides to enable the first diversion waterway and the second diversion waterway to be switched to be alternatively in communication with the inlet waterway.

4. The holder device with waterway switching function according to claim 3, wherein:

the first valve member comprises a sealing ring fixedly connected to the sliding switch bar, an inlet of the first diversion waterway and an inlet of the second diversion waterway are arranged face to face and spaced apart from each other, an outlet of the inlet waterway is disposed between the inlet of the first diversion waterway and the inlet of the second diversion waterway, the sealing ring is disposed between the inlet of the first diversion waterway and the inlet of the second diversion waterway and is coupled to the inlet of the first diversion waterway and the inlet of the second diversion waterway, and when the sealing ring closes one of the inlet of the first diversion waterway and the inlet of the second diversion waterway, the other of the inlet of the first diversion waterway and the inlet of the second diversion waterway is in communication with the inlet waterway.

5. The holder device with waterway switching function according to claim 1, wherein:

the switch comprises a moving element movably connected to the socket, the moving element is operatively connected to the first valve member, and when a handle matter is disposed in the socket or is pulled out of the socket, the moving element moves relative to the socket to trigger the first valve member.

6. The holder device with waterway switching function according to claim 1, wherein:

the first valve member comprises a sliding switch bar configured to slide relative to the holder, the sliding switch bar slides to enable the first diversion waterway and the second diversion waterway to be switched to be alternatively in communication with the inlet waterway, the switch comprises a moving element movably connected to the socket, the moving element is operatively connected to the sliding switch bar, and when a handle matter is disposed in the socket or is pulled out of the socket, the moving element moves relative to the socket to control the sliding switch bar to slide.

7. The holder device with waterway switching function according to claim 5, wherein:

the moving element is swingably connected to the socket, and the moving element abuts the first valve member to push the first valve member to slide.

8. The holder device with waterway switching function according to claim 7, wherein:

the holder is slidably connected to a push block, and the push block abuts and is disposed between the first valve member and the moving element.

9. The holder device with waterway switching function according to claim 5, wherein:

the socket is disposed with a plugged space, the moving element moves relative to the socket between a pull-out position and a plug-in position, and when the moving element is in the pull-out position, at least a portion of the moving element is disposed in the plugged space.

10. The holder device with waterway switching function according to claim 1, wherein:

an elastic element is disposed between the first valve member and the holder, when a handle matter is disposed in the socket, the elastic element stores energy, and when the handle matter is pulled out of the socket, the elastic element releases energy to drive the first valve member to reset.

11. The holder device with waterway switching function according to claim 1, wherein:

the second valve member comprises a rotating switch portion configured to rotate relative to the holder, and the rotating switch portion rotates to enable the unidirectional waterway and the second outlet waterway to be switched to be alternatively in communication with the second diversion waterway.

12. The holder device with waterway switching function according to claim 11, wherein:

an outlet of the second diversion waterway is disposed with an annular chamber, an inlet of the unidirectional waterway and an inlet of the second outlet waterway are disposed at intervals along a periphery wall of the annular chamber, the second valve member comprises a sealing pad fixedly disposed on the rotating switch portion, the sealing pad is configured to couple with the inlet of the unidirectional waterway and the inlet of the second outlet waterway, and when the sealing pad closes one of the inlet of the unidirectional waterway and the inlet of the second outlet waterway, the other of the inlet of the unidirectional waterway and the inlet of the second outlet waterway is in communication with the annular chamber.

13. The holder device with waterway switching function according to claim 1, wherein:

the first valve member comprises a sliding switch bar configured to slide relative to the holder, the sliding switch bar slides to enable the first diversion waterway and the second diversion waterway to be switched to be alternatively in communication with the inlet waterway, the second valve member comprises a rotating switch portion configured to rotate relative to the holder, the rotating switch portion rotates to enable the unidirectional waterway and the second outlet waterway to be switched to be alternatively in communication with the second diversion waterway, the rotating switch portion is disposed along a center line of the holder, and the sliding switch bar is eccentrically disposed relative to the center line of the holder.

14. The holder device with waterway switching function according to claim 6, wherein:

the moving element is swingably connected to the socket, and the moving element abuts the first valve member to push the first valve member to slide.

15. The holder device with waterway switching function according to claim 14, wherein:

the holder is slidably connected to a push block, and the push block abuts and is disposed between the first valve member and the moving element.

16. The holder device with waterway switching function according to claim 6, wherein:

the socket is disposed with a plugged space, the moving element moves relative to the socket between a pull-out position and a plug-in position, and when the moving element is in the pull-out position, at least a portion of the moving element is disposed in the plugged space.

17. A holder device with waterway switching function, comprising:

a plug, wherein:

the plug is disposed with a socket, an inlet waterway, a first outlet waterway, a second outlet waterway, and a first valve member, the socket is disposed with a switch, the plug is disposed with a first diversion waterway, a second diversion waterway, and a second valve member, the first valve member is connected to the inlet waterway, the first diversion waterway, and the second diversion waterway, the first valve member is configured to at least enable the first diversion waterway and the second diversion waterway to be switched to be alternatively in communication with the inlet waterway, the first diversion waterway is in communication with the first outlet waterway, the plug is disposed with a unidirectional waterway, the unidirectional waterway is disposed with a check valve configured to be open to enable water to flow in a direction from the second diversion waterway to the first outlet waterway, the second valve member is connected to the second diversion waterway, the unidirectional waterway, and the second outlet waterway, the second valve member is configured to enable the unidirectional waterway and the second outlet waterway to be switched to be alternatively in communication with the second diversion waterway, and the unidirectional waterway is in communication with the first outlet waterway.

18. The holder device with waterway switching function according to claim 17, wherein:

the plug is movably connected to an operation portion, and the operation portion is operatively connected to the second valve member to drive the second valve member to move for switching.

* * * * *